United States Patent [19]

Chambers

[11] 4,348,831
[45] Sep. 14, 1982

[54] DEVICE TO ASSIST GROWTH OF TOMATO PLANTS AND METHOD OF USING THE SAME

[76] Inventor: Michael Chambers, 6704 North Star Rd., Ferndale, Wash. 98248

[21] Appl. No.: 191,391

[22] Filed: Sep. 29, 1980

[51] Int. Cl.³ .............................................. A01G 13/10
[52] U.S. Cl. ........................................... 47/32; 47/9; 47/27; 47/28 R
[58] Field of Search ......................... 47/25, 27, 32-33, 47/9, 28 R, 23

[56] References Cited

U.S. PATENT DOCUMENTS

| | | | |
|---|---|---|---|
| 205,252 | 6/1878 | Delany | 47/32 |
| 280,291 | 6/1883 | Bunnell | 47/32 |
| 1,319,769 | 10/1919 | Hammond | 47/32 |
| 2,209,891 | 7/1940 | Hoover | 47/9 |
| 2,782,561 | 2/1957 | Smith | 47/25 |
| 2,802,305 | 8/1957 | MacNaughton | 47/81 |
| 2,822,644 | 2/1958 | Berger | 47/32 |
| 2,978,837 | 4/1961 | Daniels | 47/25 |
| 3,005,287 | 10/1961 | Dudley | 47/25 |
| 3,058,263 | 10/1962 | Reynolds | 47/79 |
| 3,857,195 | 12/1974 | Johnson | 47/32 |
| 3,896,586 | 7/1975 | Caldwell | 47/28 R |
| 4,154,022 | 5/1979 | Costanzo | 47/32 X |
| 4,268,992 | 5/1981 | Scharf | 47/23 |

FOREIGN PATENT DOCUMENTS

| | | | |
|---|---|---|---|
| 1163596 | 2/1964 | Fed. Rep. of Germany | 47/27 |
| 2433291 | 4/1980 | France | 47/32 |
| 234732 | 2/1945 | Switzerland | 47/32 |
| 518054 | 3/1972 | Switzerland | 47/9 |
| 3615 | of 1902 | United Kingdom | 47/32 |

*Primary Examiner*—Robert E. Bagwill
*Attorney, Agent, or Firm*—Hughes, Barnard & Cassidy

[57] ABSTRACT

A device formed as an integral plastic piece having an inner tubular portion to surround the stalk of the tomato plant and an outer support portion which defines a circumferential trough surrounding the inner tubular portion. The inner tubular portion is placed around the stalk of the tomato plant, with the lower edge of the tubular portion being implanted into the ground. The upper growth portion (i.e., vines) of the tomato plant and the tomatoes are conveniently retained in the trough.

21 Claims, 3 Drawing Figures

DEVICE TO ASSIST GROWTH OF TOMATO PLANTS AND METHOD OF USING THE SAME

BACKGROUND OF THE INVENTION

The present invention relates to a device for assisting in the growth of tomato plants, and to a method of using this device. This device is useful for not only the initial growth of the tomato plant, but also in the later growth stage where tomatoes are produced.

It sometimes happens that tomato plants are planted in a garden without the use of any auxiliary apparatus to position or somehow keep the tomato plant off of the ground surface. In that case, during the initial stages of growth, the stalk of the tomato plant grows vertically up to a height of a foot or more, and then begins sprouting branches or vines which eventually bear the tomatoes themselves. As the vines continue to grow, and as tomatoes appear on the vines, the combined weight of the tomatoes and vines causes the plant to droop toward the ground. Eventually, the vines and the tomatoes rest on the ground for a substantial period of the growth of the plant.

One of the problems of permitting the tomato plants to grow in this manner is that during the period when the tomatoes are on the ground and maturing into ripe tomatoes, the tomatoes are subject to deterioration from insects, blight, or rot. Also, the task of harvesting the tomatoes from the ground surface is somewhat difficult. Accordingly, many people will "stake" their tomatoes plants by driving a long, wooden stake into the ground adjacent the base of the tomato plant. Then the stalk of the tomato plant is tied to the stake, and possibly some of the vines are tied to the stake at a higher location. Thus, the tomatoes on the vines are maintained at a higher location, where they are not subject to deterioration on the ground, and where they can be more easily picked. However, even with the tomato plants staked in an upright position, some of the tomatoes can still drop from the vines, possibly to become bruised when striking the ground, and also soon deteriorating if they are not quickly harvested. Thus, the staking of tomato plants is not a totally satisfactory process, in that some of the tomatoes are still lost, and the task of staking individual tomato plants is a rather time consuming project.

Also, it has been a commercial practice in growing tomato plants to lay down a strip of plastic, possibly one foot in width, and plant the tomato plants at various locations through holes along the center line of the plastic strip. The plastic strip serves to hold moisture in the ground adjacent the roots of the plants, and also to prevent the growth of weeds immediately around the plant. Further, in some instances, a vertical sheet of plastic is placed along one side of the tomato plants to protect them from the wind.

A search of the prior art that appears in the U.S. patent literature has disclosed a number of devices which can be used to support, protect, or somehow assist the growth of various plants. Typical of these are the following:

U.S. Design Pat. No. 219,609, Orthman, shows a "tomato vine support" which is made up of a support base having four legs, and an upwardly extending set of circular wire pieces. The wire pieces flare outwardly in an upward direction to provide an inverted cone-shaped support structure.

U.S. Pat. No. 69,356, Jillson, shows what is called a "strawberry-ripener". This device is a dome-shaped member having a central through-opening through which the plant extends. The strawberries themselves rest on the downwardly and outwardly extending upper surface of the dome-shaped member.

U.S. Pat. No. 205,252, Delaney, also shows a device to assist strawberries. This particular device is in the form of a plate or dish which has a central opening to receive the plant, and an outwardly and moderately upwardly extending annular, plate-like support portion.

U.S. Pat. No. 280,291, Bunnell, shows an insect trap. This is a box-like structure which defines a square "V" shaped trough which is implanted in the ground around the plant. Presumably, insects which make their way toward the plant fall into the trough.

U.S. Pat. No. 1,319,769, Hammond, shows yet another strawberry plant support, which fits flat against the ground in the area surrounding the plant.

U.S. Pat. No. 2,209,891, Hoover, shows a wire framework adapted to be positioned a moderate distance above the ground, and surrounding the plant. Mulch is placed on top of the support to protect the plant during cold weather. Other benefits are claimed, such as positioning the wire structure at a location to prevent rodent nest building over the frozen ground.

U.S. Pat. No. 2,802,305, MacNaughton, shows an attachment for a flower pot to provide for self-watering of the plant within the flower pot. The annular cavity defined by the attachment if filled with water, and a wick-like material is inserted into the water and extends into the pot to cause water to flow to the plant by capillary action.

U.S. Pat. No. 2,822,644, Berger, shows a device to protect plants, which device is in the form of a plate-like member which fits circumferentially around the plant. This plate-like member is formed with a number of circular corrugations which fit against the ground surface. The purpose of this is to prevent air circulation and thus prevent the evaporation of moisture from the ground surface.

U.S. Pat. No. 2,978,837, Daniels, discloses a "grass guard for trees". This apparatus has an inner cone-shaped member which slants downwardly and outwardly from the tree, and an outer flat, annular portion. At its peripheral edge, it is anchored into the ground by a circumferential flange that extends into the ground.

U.S. Pat. No. 3,005,287, Dudley, discloses what is termed a "mulch and plant feeder". This comprises a plate-like member which fits against the ground surface, with a circumferential flange which is imbedded into the ground surface.

U.S. Pat. No. 3,058,263, Reynolds, shows an attachment to be affixed to the lower side of a flower pot.

U.S. Pat. No. 4,154,022, Costanzo, shows a structure for the cultivation of nursery plants which is presumably placed in the ground adjacent to the plants. One feature of this device is a means to indicate the age of the plant.

SUMMARY OF THE INVENTION

The device of the present invention is designed to assist the growth of a plant, such as a tomato plant which has a root portion, a stalk portion and an upper growth portion. The device is adapted to be positioned at a ground location. This device comprises an inner tubular portion having a vertically extending wall means defining a substantially vertical passageway. The tubular portion has a lower end adapted to be positioned at a lower ground location, and an upper end adapted to be positioned further above the ground location, with the vertical passageway permitting growth of the stalk portion of the plant upwardly therethrough.

The device also comprises an outer support portion which comprises a downwardly and outwardly sloping second wall means positioned around and spaced radially outwardly from the first wall means. There is a lower trough extending around and connected to the second wall means and an upwardly turned outer rim connected to and surrounding the trough.

In the preferred form, the lower end of the tubular portion is located vertically below a plane defined by the trough, whereby the lower end of the tubular portion can be inserted into the ground location, with the trough resting on a ground surface at the ground location. The tubular portion has a generally circular configuration, and the first wall means tapers inwardly in a downward direction.

Desirably the trough is provided with hole means which permit flow of water therethrough. Also in the preferred form the device is made of an opaque material to prevent passing of direct sunlight into a portion of ground surrounding the tubular portion.

While the device of the present invention could be made in varying sizes to accommodate various sizes of plants, to be used with conventional tomato plants, the following dimensions for the device have been found suitable. The tubular portion would desirably extend upwardly from the ground location a distance between 9 inches to 18 inches, when the trough of the device is positioned at the ground location. The outer rim would have a diameter between 2 feet to 4 feet. The upper edge of the rim would be positioned between 2 inches to 6 inches above the ground surface when the device is placed at a ground location. The tubular portion would have a lower diameter between 2 inches to 6 inches, and an upper diameter of between 4 inches to 9 inches.

In the method of the present invention the tubular portion is placed around the plant at a ground location, so that the stalk of the plant can grow upwardly through the tubular portion. The outer support portion is provided around the tubular portion so that the upper portion of the plant can grow outwardly over the support portion and rest thereon. The tomatoes, or other food product which could possibly be utilized with the present invention, are supported by the support portion as they mature to the ripe condition.

Other features will become apparent from the following detailed description.

DESCRIPTION OF THE PREFERRED EMBODIMENT

Figure 1:
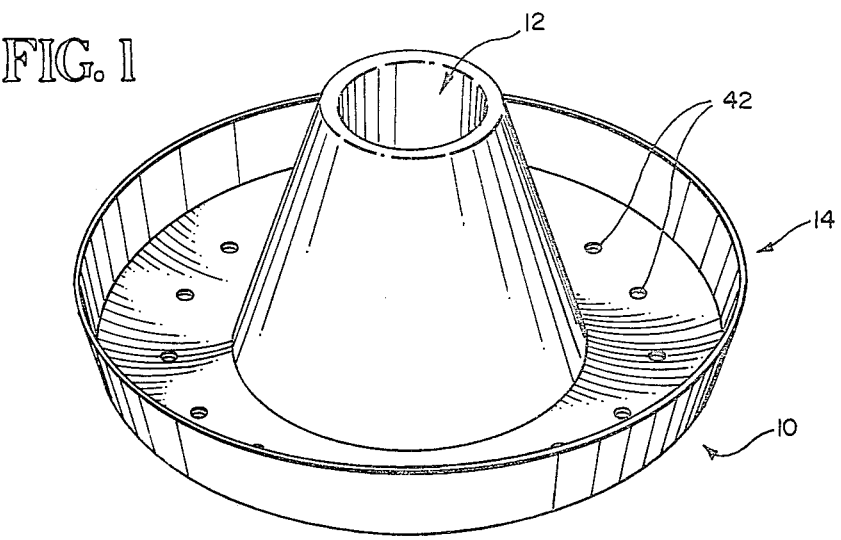
FIG. 1 is an isometric view looking downwardly and laterally toward the apparatus of the present invention.

The device of the present invention, generally designated 10, is desirably made as a unitary structure in the form of a single piece of plastic. For purposes of describing function, the device 10 can be considered as comprising a central tubular portion 12 and an outer support portion 14.

The tubular portion 12 has a generally cylindrical configuration, which tapers inwardly in a downward direction. The lower part 16 of the tubular portion 12 is adapted to be imbedded a moderate distance (e.g., 2 to 3 inches) into the ground surface 18. The upper circumferential edge 20 of the tubular portion 12 is rounded moderately to form a curved transition portion 22 that connects to the outer support portion 14.

The outer support portion 14 can be considered as being made up of three parts, namely an outwardly sloping wall 24, a circumferential trough 26, and an upturned outer rim 28. The wall 24 connects by its upper edge to the curved transition portion 22, and extends downwardly and outwardly at approximately a 20° angle from the center axis 30, which is defined by the tubular portion 12. In effect, the configuration of the wall 24 is a frusto-conical shape.

The lower edge portion 32 of the sloping wall 24 joins to (more precisely blends into) the upper inner portion 34 of the trough 26. The trough 26 bottoms out at a lower location 36, and from the location 36 curves moderately upwardly in an outward direction, as at 38. The outer rim 28 is simply an upward extension of the outer part 36 of the trough 26, and terminates at an outer circumferential edge 40.

The trough 26 is adapted to rest on the ground surface 18. Thus, for the lower part 16 of the tubular portion 12 to extend into the ground, this lower part 16 is positioned below a horizontal plane defined by the lowermost surface portion of the trough 26. There are a plurality of through holes 42 formed in the lowermost part 36 of the trough 26 in an evenly spaced circular configuration. These holes 42 serve two functions. First, rain water or other water which may collect in the trough 26 can drain through the holes 42 to the underlying ground to provide water for the tomato plant, indicated at 44 in FIGS. 2 and 3. Second, some of the holes 42 can be used to receive spikes or other fastening devices by which the device 10 can be secured to the underlying ground. For example, in FIGS. 2 and 3, one such spike 46 is shown as inserted through one of the holes 42 and imbedded into the underlying ground.

Figure 2:
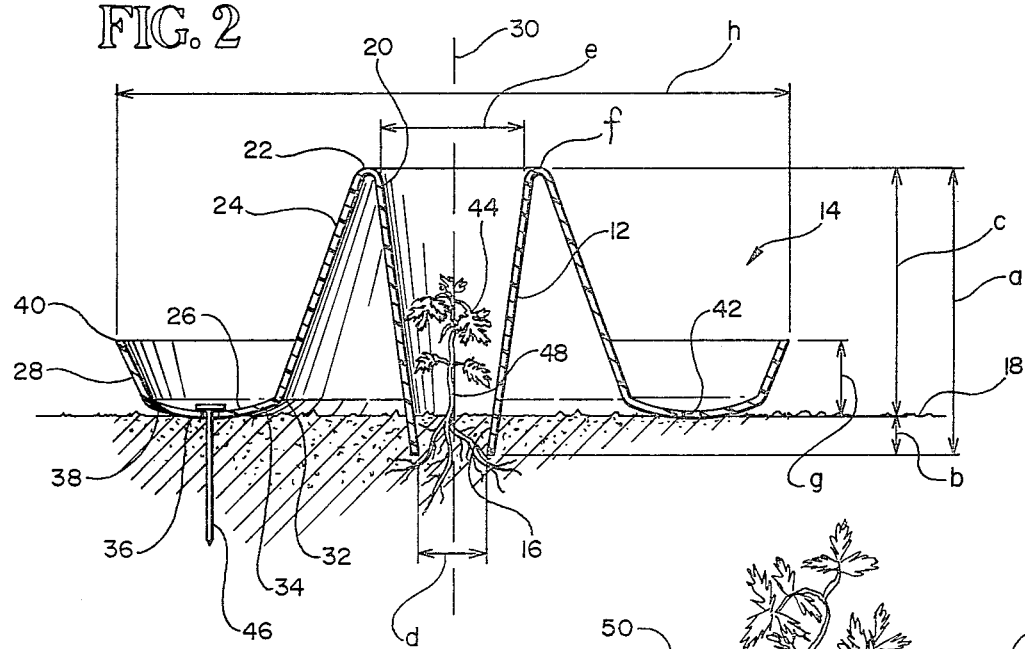
FIG. 2 is a cross-sectional view taken through the vertical centerline of the present invention, showing the invention used for the initial growth of the tomato plant; and, FIG. 3 is a view similar to FIG. 2, showing the apparatus of the present invention in use with a more mature tomato plant.
Figure 3:
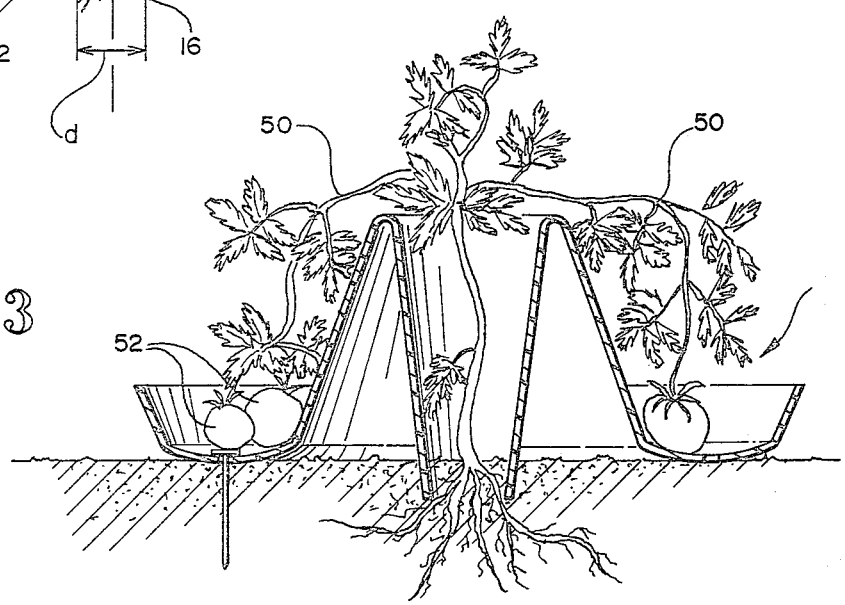

The manner in which the present invention is used will now be described with reference to FIGS. 2 and 3. First, let it be assumed that a small tomato plant 44, in its early stage of growth, has already been planted into the ground. The device 10 is positioned over the plant 44 so that the tubular portion 12 surrounds the plant. Then, the device 10 is pushed downwardly so that the lower part 16 of the tubular portion 12 is imbedded into the ground surface, as illustrated in FIG. 2. This lower part 16 is pushed into the ground surface until the trough 26 comes into contact with the ground surface 18.

Unless some particular circumstance would dictate otherwise, the device 10 would normally remain in that position throughout the entire growth of the tomato plant 44. In the initial stage of growth of the plant 44, the stalk 48 of the plant grows upwardly through the tubular portion 12 and eventually extends upwardly beyond the curved transition portion 22. During this initial growth stage, the device 10 protects the surrounding portion of the ground surface 18 from direct sunlight, and thus inhibits the growth of weeds. To accomplish this purpose, the device 10 is desirably made of an opaque material, preferably having a black color, so that heat from the sun is absorbed by the device 10 to enhance growth of the plant 44, and also ripening of the tomatoes. Also, the device 44 inhibits the evaporation of moisture from the surrounding part of the ground surface, not only to enhance growth of the plant, but to keep the soil loose. As indicated previously, the rainfall still enters into the ground surface 18 through the holes 42 in the trough 26. Further air space enclosed by the device acts as an insulating dead air space to enhance growth in the early stages.

As the growth of the tomato plant continues, eventually it sprouts vines or branches 50 from its upper portion 22 and eventually develop small tomatoes 52. The force of gravity causes the vines 50 and the tomatoes 52 to droop downwardly over the sloping wall 24 and toward the trough 26. As growth continues, the tomatoes 52 come to be positioned in the trough 26 and remain there through the rest of their growth. In this location in the trough 26, the tomatoes 52 are protected from the ground surface, and can easily be harvested when they are ripe.

The overall dimensions of the device 10 will depend to a large extent on the growth characteristics of the tomatoe plants for a particular geographical area. In functional terms, the height of the tubular portion 12 above the ground surface 18 should be moderately less than the height at which the stalk 48 develops outwardly extending branches. (This obviously is done so that the branches can extend outwardly over the transition portion 22.) With regard to the dimensions of the wall 24, trough 26 and rim 28, these should be sufficiently wide and have sufficient vertical depth to contain the vines and the tomatoes up to and including the period of maximum growth.

For most growing conditions, the present dimensions are believed to be suitable. These dimensions are based upon the growth characteristics of tomato plants in the coastal portion of the Pacific Northwest of the United States. First, the overall height dimension of the tubular portion 12 (indicated at "a") would be approximately 15 inches, with the preferred range being between 12 inches and 20 inches. As indicated previously, the lower part of the tubular portion 12 that extends into the ground (indicated at "b") would be between 2 to 3 inches. This would make the height dimensions of the tubular part 12 above the ground (indicated at "c") be somewhere between 9 to 18 inches.

The diameter of the lower edge of the lower part 16 of the tubular portion 12 (indicated at "d") is desirably about 4 inches, and within the broader range could be between 2 to 6 inches. The diameter of the upper edge portion 20 of the tubular portion 12 (indicated at "e") is desirably about 6 inches, and in the broader range would be between 4 inches and 9 inches. The radius of curvature of the curved transition portion 22 can very substantially. Desirably, the curve would be sufficiently gradual so that there would be no abrupt edge over which the vines 50 would rest. A radius of curvature of 1 inch has been found to be appropriate, but this could possibly be varied between ½ inch up to 2 inches or possibly larger. (The location of the radius of curvature is indicated at "f").

The height of the outer circumferential edge 40 above the ground surface is indicated at "g", and this dimension could be between 2 inches to 6 inches. With regard to the overall diameter of the device 10 (indicated at "h" and extending across the entire circumferential edge 40), this would be approximately 3 feet, and within a broader range could be between 2 feet to 4 feet.

A rather desirable feature of the present invention is that the devices 10 can be stacked closely one on top of the other for shipment or storage. For this reason, the taper of the tubular portion 12 and of the sloping wall 24 should be sufficient to permit this nesting of the devices 10. Also a transparent dome or other structure could be placed over the device 10 and plant 44 to obtain the greenhouse effect.

What is claimed is:

1. A device to assist the growth of a plant, such as a tomato plant which has a root portion, a stalk portion and an upper growth portion, said device being adapted to be positioned at a ground location and comprising:
   (a) an inner tubular portion comprising a vertically extending first wall means defining a substantially vertical passageway, said first wall means having a lower end and an upper end, said first wall means adapted to be positioned with the lower end at a lower ground location and the upper end further above the ground location, with the vertical passageway permitting growth of the stalk portion of the plant upwardly therethrough and being of a height sufficient to surround at least a substantial part of said stalk portion,
   (b) an outer support portion comprising:
      1. a downwardly and outwardly sloping second wall means surrounding and spaced radially outwardly from the first wall means, and having an upper inner edge portion adjacent to the upper end of the first wall means, in a manner that said upper growth portion is permitted to grow downwardly over said second wall means,
      2. a lower trough means extending around and connected to the second wall means to support the upper growth portion,
      3. an upwardly turned outer rim means connected to and surrounding the trough means.

2. The device as recited in claim 1, wherein the lower end of the tubular portion is located vertically below a plane defined by the trough, whereby the lower end of the tubular portion can be inserted into the ground location, with the trough means resting on a ground surface at the ground location.

3. The device as recited in claim 2, wherein said tubular portion has a generally cylindrical configuration and tapers inwardly in a downward direction.

4. The device as recited in claim 1 wherein said tubular portion has a generally cylindrical configuration and tapers inwardly in a downward direction.

5. The device as recited in claim 1, wherein said trough means is provided with hole means which permit flow of water therethrough.

6. The device as recited in claim 1, wherein said device is made of an opaque material to prevent passing of direct sunlight into a portion of ground surrounding said tubular portion.

7. The device as recited in claim 1, wherein said tubular portion has a configuration such that the tubular portion extends upwardly from the ground location a distance between 9 inches to 18 inches, when the trough means of the device is positioned on the ground location.

8. The device as recited in claim 1, wherein the outer rim means has a diameter between 2 feet to 4 feet.

9. The device as recited in claim 1, wherein an upper edge of said rim means is positioned between 2 inches to 6 inches above a ground surface, when the device is placed at a ground location.

10. The device as recited in claim 1, wherein a lower edge of the tubular portion has a diameter between 2 to 6 inches, and an upper edge of said tubular portion has a diameter between 4 inches to 9 inches.

11. The device as recited in claim 1, wherein
   (a) said tubular portion has a configuration such that the tubular portion extends upwardly from the ground location a distance between 9 inches to 18 inches, when the trough means of the device is positioned on the ground locations,
   (b) the outer rim means has a diameter between 2 feet to 4 feet,
   (c) a lower edge of the tubular portion has a diameter between 2 to 6 inches, and an upper edge of said tubular portion has a diameter between 4 to 9 inches.

12. A method to assist growth of a plant, such as a tomato plant which has a root portion, a stalk portion and an upper growth portion, said method comprising:
   (a) providing a tubular member comprising a vertically extending first wall means defining a vertical passageway, and positioning this tubular member around said plant at a ground location,
   (b) providing an outer support member which comprises a downwardly and outwardly sloping second wall means having an upper edge adjacent an upper edge of said tubular member, a lower trough means extending around and connecting to the second wall means, and an upwardly turned outer rim connected to and surrounding the trough, and positioning this support member around and outwardly of the tubular member, thus causing an upper growth portion of the plant to be supported by said trough means.

13. The method as recited in claim 12, wherein said tubular member and said support member are made of an opaque material so that direct sunlight is prevented from contacting a ground surface portion under said tubular member and said support member.

14. The method as recited in claim 12, further comprising providing said support member with through holes at a lower location of said support member, whereby water that falls on said support member can drain through said through holes to be absorbed into ground surrounding the plant.

15. A device to assist the growth of a plant, such as a tomato plant which has a root portion, a stalk portion and an upper growth portion, said device being adapted to be positioned at a ground location and comprising:
   (a) an inner tubular portion comprising a vertically extending first wall means defining a substantially vertical passageway, said first wall means having a lower end and an upper end, said first wall means adapted to be positioned with the lower end at a lower ground location and the upper end further above the ground location, with the vertical passageway permitting growth of the stalk portion of the plant upwardly therethrough and being of a height sufficient to surround at least a substantial part of said stalk portion,
   (b) an outer support portion comprising a downwardly and outwardly sloping second substantially closed wall means positioned around and extending radially outwardly from the first wall means, said second wall means having an upper edge connecting to an upper edge of the first wall means, and a lower edge positioned adjacent a ground location.

16. The device as recited in claim 15, wherein the lower end of the tubular portion is located vertically below the outer support portion, whereby the lower end of the tublar portion can be inserted into the ground location, with the support portion resting on a ground surface at the ground location.

17. The device as recited in claim 16, wherein said tubular portion has a generally cylindrical configuration and tapers inwardly in a downward direction.

18. The device as recited in claim 15 wherein said tubular portion has a generally cylindrical configuration and tapers inwardly in a downward direction.

19. The device as recited in claim 15, wherein said device is made of an opaque material to prevent passing of direct sunlight into a portion of ground surrounding said tubular portion.

20. The device as recited in claim 15, wherein said tubular portion has a configuration such that the tubular portion extends upwardly from the ground location a distance between 9 inches to 18 inches, when the support portion of the device is positioned on the ground location.

21. The device as recited in claim 15, wherein a lower edge of the tubular portion has a diameter between 2 to 6 inches, and an upper edge of said tubular portion has a diameter between 4 inches to 9 inches.

* * * * *